United States Patent
Okatsu et al.

(10) Patent No.: US 12,227,816 B2
(45) Date of Patent: *Feb. 18, 2025

(54) HIGH-STRENGTH SEAMLESS STEEL PIPE AND METHOD FOR MANUFACTURING SAME

(71) Applicant: JFE Steel Corporation, Tokyo (JP)

(72) Inventors: Mitsuhiro Okatsu, Tokyo (JP); Masao Yuga, Tokyo (JP); Toshiharu Hirama, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 407 days.

This patent is subject to a terminal disclaimer.

(21) Appl. No.: 17/787,397

(22) PCT Filed: Nov. 24, 2020

(86) PCT No.: PCT/JP2020/043650
§ 371 (c)(1),
(2) Date: Jun. 20, 2022

(87) PCT Pub. No.: WO2021/131460
PCT Pub. Date: Jul. 1, 2021

(65) Prior Publication Data
US 2023/0055650 A1  Feb. 23, 2023

(30) Foreign Application Priority Data

Dec. 26, 2019  (JP) ................ 2019-235906

(51) Int. Cl.
| | | |
|---|---|---|
| *C21D 9/08* | (2006.01) | |
| *C21D 6/00* | (2006.01) | |
| *C21D 8/10* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |
| *F16L 9/02* | (2006.01) | |

(52) U.S. Cl.
CPC ............ *C21D 9/085* (2013.01); *C21D 6/004* (2013.01); *C21D 6/005* (2013.01); *C21D 6/008* (2013.01); *C21D 8/105* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *F16L 9/02* (2013.01)

(58) Field of Classification Search
None
See application file for complete search history.

(56) References Cited

U.S. PATENT DOCUMENTS

| | | |
|---|---|---|
| 6,267,828 B1 | 7/2001 | Kushida et al. |
| 2006/0018783 A1 | 1/2006 | Itou |
| 2007/0137736 A1 | 6/2007 | Omura et al. |
| 2015/0041030 A1 | 2/2015 | Kondo et al. |
| 2019/0048443 A1 | 2/2019 | Okatsu et al. |
| 2019/0226063 A1 | 7/2019 | Arai et al. |
| 2021/0198775 A1 | 7/2021 | Kamitani et al. |

FOREIGN PATENT DOCUMENTS

| | | |
|---|---|---|
| EP | 3508603 A1 | 7/2019 |
| EP | 3778971 A1 | 2/2021 |
| JP | 07197125 A | 8/1995 |
| JP | 2000178682 A | 6/2000 |
| JP | 2001172739 A | 6/2001 |
| JP | 2002060893 A | 2/2002 |
| JP | 2005350754 A | 12/2005 |
| JP | 2017002369 A | 1/2017 |
| WO | 2013133076 A1 | 9/2013 |
| WO | 2018043570 A1 | 3/2018 |
| WO | 2019198459 A1 | 10/2019 |
| WO | 2019198468 A1 | 10/2019 |

OTHER PUBLICATIONS

International Search Report and Written Opinion for International Application No. PCT/JP2020/043650, dated Feb. 16, 2021, 5 pages.
Thebault, F. et al., "Accurate determination of Klapplied for Nace TM0177 method D test", XP002808986, Database Accession No. E20133616688338, & Nace—Intl. Corrosion Conference Series—Corrosion 2013 Conference & Expo 2013 National Assoc. of Corrosion Engineers Intl. USA, 2013, 3 pages.
Extended European Search Report for European Application No. 20905553.2, dated Apr. 20, 2023, 10 pages.
Office Action issued by the U.S. Patent and Trademark Office in the U.S. Appl. No. 17/787,402, mailed Oct. 7, 2024, U.S. Patent and Trademark Office, Alexandria, VA. (7 pages).

*Primary Examiner* — Anthony M Liang
(74) *Attorney, Agent, or Firm* — Buchanan Ingersoll & Rooney PC

(57) ABSTRACT

Provided herein is a high-strength seamless steel pipe, and a method for manufacturing same. A high-strength seamless steel pipe of the present invention has a yield strength of 758 MPa or more, and a $K_{ILIMIT}$ value of 23.0 MPa$\sqrt{m}$ or more as an evaluation index of sulfide stress corrosion cracking resistance.

12 Claims, 4 Drawing Sheets

[FIG. 1]
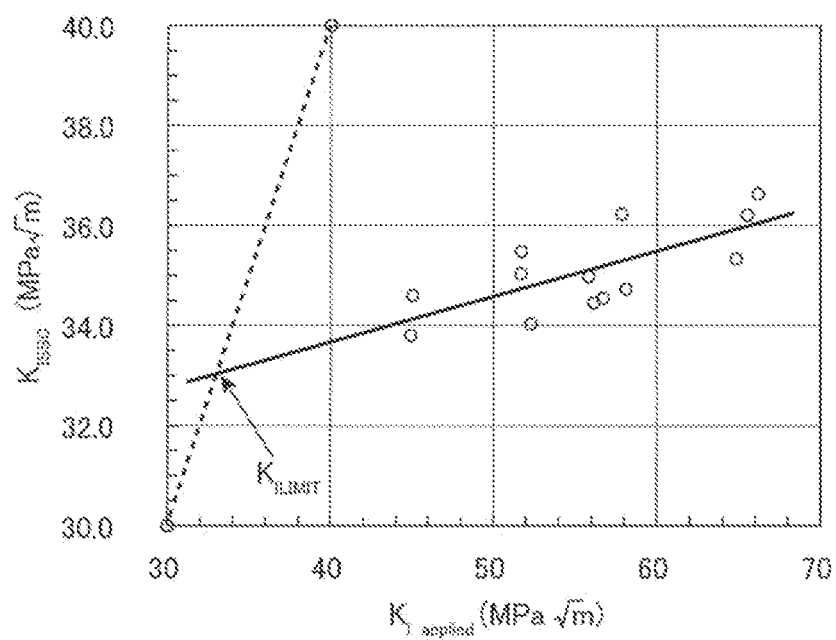
[FIG. 2]
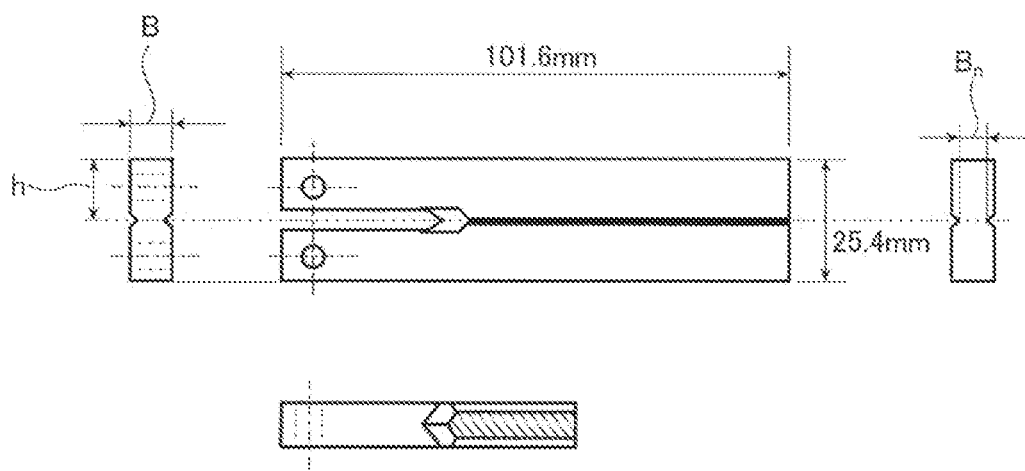

[FIG. 3]
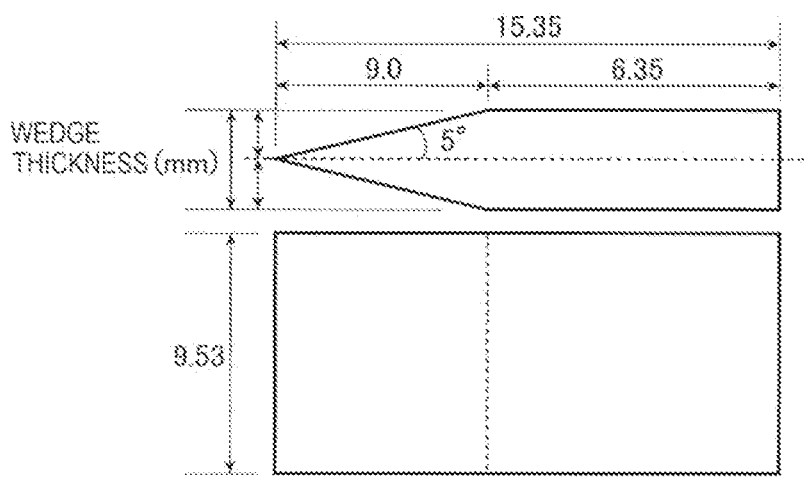
[FIG. 4]
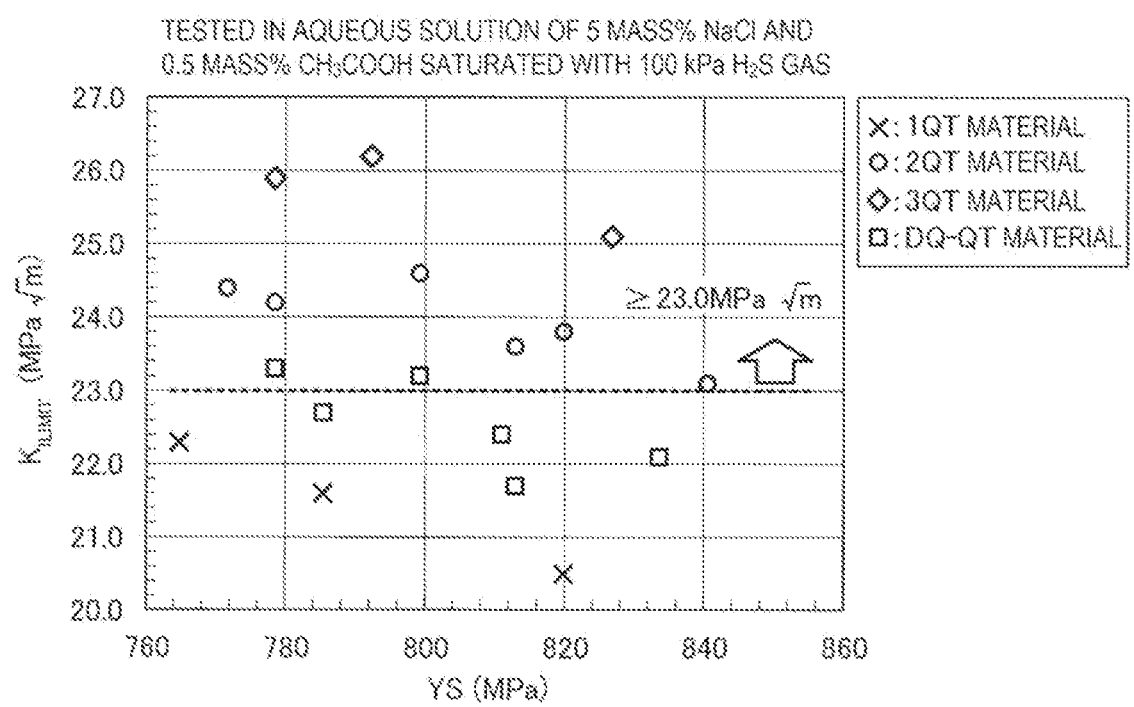

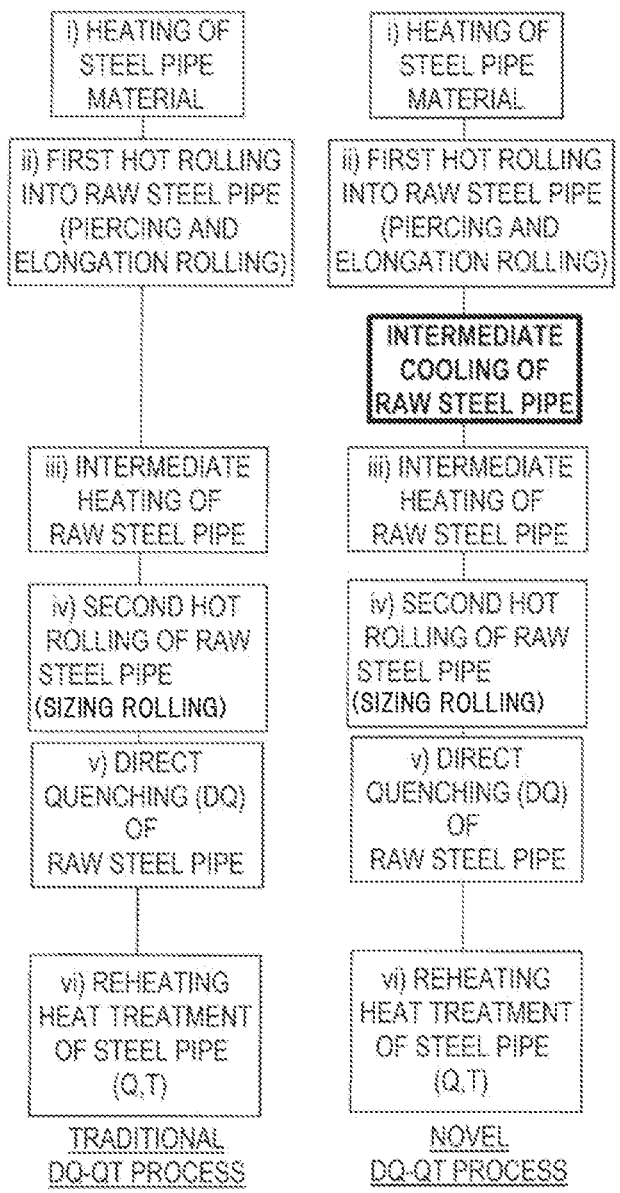
[FIG. 5]

[FIG. 6]
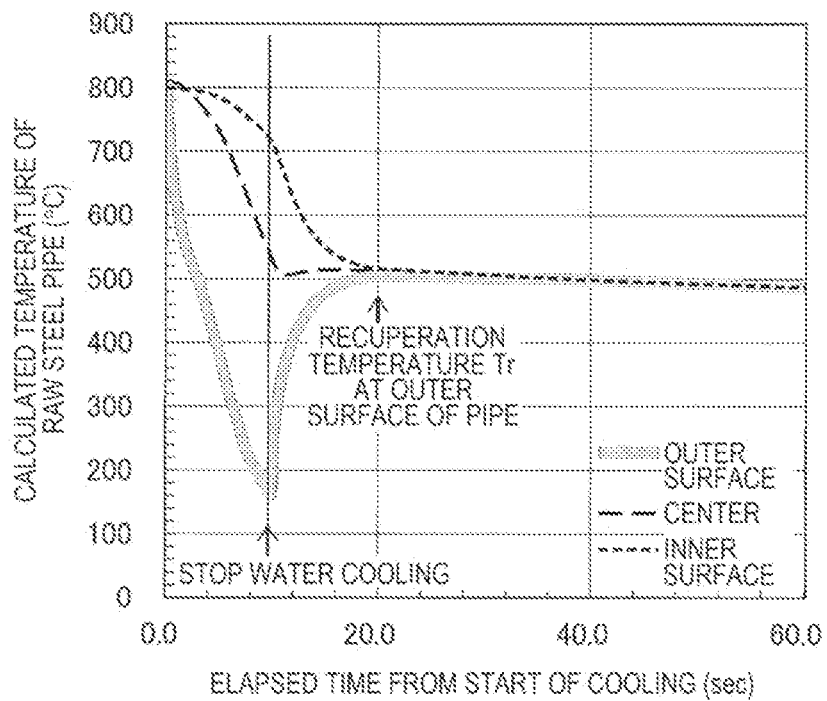
[FIG. 7]
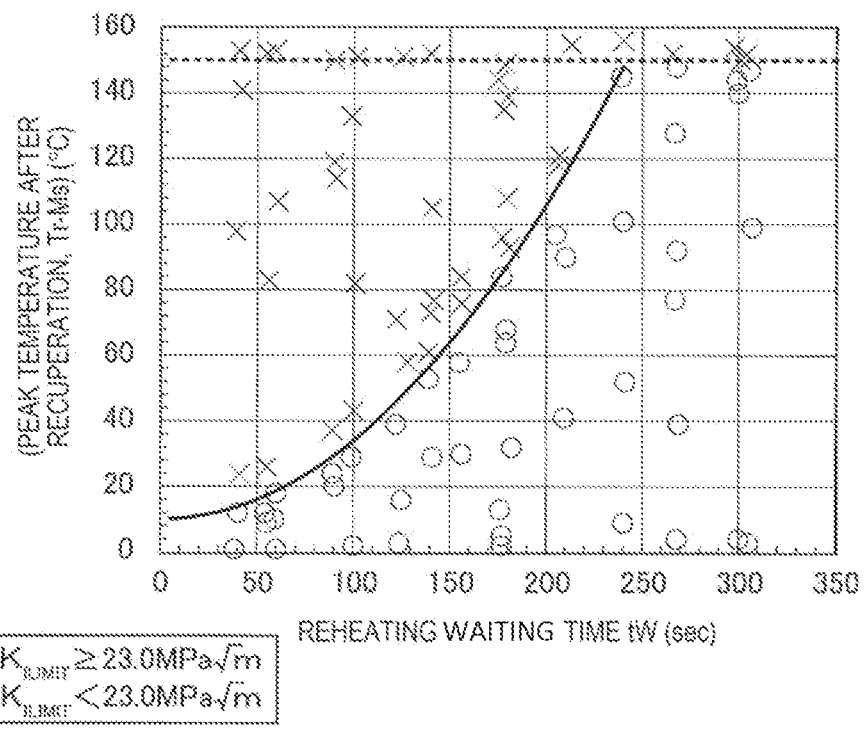

HIGH-STRENGTH SEAMLESS STEEL PIPE AND METHOD FOR MANUFACTURING SAME

CROSS REFERENCE TO RELATED APPLICATIONS

This is the U.S. National Phase application of PCT/JP2020/043650 filed Nov. 24, 2020 which claims priority to Japanese Patent Application No. 2019-235906, filed Dec. 26, 2019, the disclosures of these applications being incorporated herein by reference in their entireties for all purposes.

FIELD OF THE INVENTION

The present invention relates to a high-strength seamless steel pipe for oil wells and gas wells, specifically, a high-strength seamless steel pipe having excellent sulfide stress corrosion cracking resistance (SSC resistance) in sour environments containing hydrogen sulfide. The present invention also relates to a method for manufacturing such a high-strength seamless steel pipe.

BACKGROUND OF THE INVENTION

Increasing crude oil prices and an expected shortage of petroleum resources in the near future have prompted active development of oil fields and gas fields that were unthinkable in the past, for example, such as in deep oil fields, and in oil fields and gas fields of severe corrosive environments containing hydrogen sulfide, or sour environments as they are also called. Steel pipes for oil country tubular goods used in such environments are required to be made of materials having high strength and superior corrosion resistance (sour resistance).

In response to such demands, for example, PTL 1 discloses a steel for oil country tubular goods having improved sulfide stress corrosion cracking resistance, specifically, a low alloy steel comprising, in weight %, C: 0.2 to 0.35%, Cr: 0.2 to 0.7%, Mo: 0.1 to 0.5%, and V: 0.1 to 0.3%, and that specifies a total amount of precipitating carbides, and the fraction of MC-type carbides therein.

PTL 2 discloses a steel material for oil country tubular goods having improved sulfide stress corrosion cracking resistance. The steel material disclosed in this related art document comprises, in mass %, C: 0.15 to 0.30%, Si: 0.05 to 1.0%, Mn: 0.10 to 1.0%, P: 0.025% or less, S: 0.005% or less, Cr: 0.1 to 1.5%, Mo: 0.1 to 1.0%, Al: 0.003 to 0.08%, N: 0.008% or less, B: 0.0005 to 0.010%, and Ca+O (oxygen): 0.008% or less, and one or two or more selected from Ti: 0.005 to 0.05%, Nb: 0.05% or less, Zr: 0.05% or less, and V: 0.30% or less. Concerning the properties of the inclusions in the steel, the steel specifies the maximum length of continuous nonmetallic inclusions, and the number of particles with a particle diameter 20 μm or more.

PTL 3 discloses a steel for oil country tubular goods having improved sulfide stress corrosion cracking resistance. The steel disclosed in this related art document comprises, in mass %, C: 0.15 to 0.35%, Si: 0.1 to 1.5%, Mn: 0.1 to 2.5%, P: 0.025% or less, S: 0.004% or less, sol. Al: 0.001 to 0.1%, and Ca: 0.0005 to 0.005%, and specifies the composition of Ca-base nonmetallic inclusions, the composite oxide of Ca and Al, and the HRC hardness of steel.

PTL 4 discloses a low alloy steel for oil country tubular goods having improved sulfide stress corrosion cracking resistance, and a yield strength of 861 MPa or more. The low alloy steel disclosed in this related art document comprises, in mass %, C: 0.2 to 0.35%, Si: 0.05 to 0.5%, Mn: 0.05 to 1.0%, P: 0.025% or less, S: 0.01% or less, Al: 0.005 to 0.10%, Cr: 0.1 to 1.0%, Mo: 0.5 to 1.0%, Ti: 0.002 to 0.05%, V: 0.05 to 0.3%, B: 0.0001 to 0.005%, N: 0.01% or less, and O: 0.01% or less, and sets a predetermined value for a formula containing the full width at half maximum of the [211] plane of the steel, and a hydrogen diffusion coefficient.

The sulfide stress corrosion cracking resistance of the steels disclosed in PTL 1 to PTL 3 is a measure of the presence or absence of SSC after a round-rod tensile test specimen is immersed in a test bath under a constant stress load for 720 hours in compliance with method A of NACE (National Association of Corrosion Engineering) TM0177. The sulfide stress corrosion cracking resistance of the steel disclosed in PTL 4 is a measure of whether the stress intensity factor $K_{ISSC}$ value obtained in a hydrogen sulfide corrosive environment after a DCB (Double Cantilever Beam) test conducted in compliance with method D of NACE TM0177 is equal to or greater than a specified value.

PATENT LITERATURE

PTL 1: JP-A-2000-178682
PTL 2: JP-A-2001-172739
PTL 3: JP-A-2002-60893
PTL 4: JP-A-2005-350754

SUMMARY OF THE INVENTION

The revisions made to NACE TM0177 in 2016 introduced $K_{ILIMIT}$ value, a new index of sulfide stress corrosion cracking resistance. FIG. 1 is a diagram explaining the method for finding a $K_{ILIMIT}$ value. For determination of a $K_{ILIMIT}$ value, the applied stress intensity factor $K_{Iapplied}$ at the tip of a notch of a test specimen before start of a DCB test is plotted against the $K_{ISSC}$ value obtained in a DCB test conducted multiple times under different test conditions, as shown in FIG. 1. A $K_{ILIMIT}$ value can then be determined from the intersection between the linear regression line of $K_{ISSC}$ values, and the line on which $K_{ISSC}$ and $K_{Iapplied}$ are one-to-one. In FIG. 1, the vertical axis and horizontal axis represent $K_{ISSC}$ and $K_{Iapplied}$, respectively. PTL 1 to PTL 4 do not disclose anything about specific measures for improving $K_{ILIMIT}$ value in warranting sulfide stress corrosion cracking resistance using $K_{ILIMIT}$ value.

Aspects of the present invention were made in face of the problems discussed above, and it is an object according to aspects of the present invention to provide a high-strength seamless steel pipe having high strength equivalent to at least the C110 grade of the API standards, and having excellent sulfide stress corrosion cracking resistance (SSC resistance), specifically, a high and stable $K_{ILIMIT}$ value, in hydrogen sulfide-containing sour environments. Aspects of the present invention are also intended to provide a method for manufacturing such a high-strength seamless steel pipe.

The present inventors conducted intensive studies to find a solution to the foregoing problems. First, three types of steel pipe materials (steel Nos. A to C) that had compositions satisfying the API standards were prepared, as shown in Table 1. These steel pipe materials were used to produce test steel pipes (seamless steel pipes) having an outer diameter of 311 mm, a wall thickness of 27.8 mm, and different yield strengths, using various manufacturing processes. In Table 1, the symbol "-" means that the element was not intentionally added, meaning that the element may be absent (0%), or may be incidentally present. For DCB test, a DCB test specimen, measuring 9.5 mm in thickness, 25.4 mm in width, and 101.6 mm in length, was taken from an arbitrarily chosen circumferential position at an end of the steel pipe using method D of NACE TM0177, as shown in FIG. 2.

the other materials, and that was subjected to reheating quenching and tempering after direct quenching (hereinafter, also referred to as DQ, which describes quenching performed immediately after hot rolling, while the steel pipe temperature is still high).

TABLE 1

| Steel No. | Composition mass %) | | | | | | | | | | | | | | | |
|---|---|---|---|---|---|---|---|---|---|---|---|---|---|---|---|---|
| | C | Si | Mn | P | S | Cr | Mo | Al | Cu | Nb | V | B | Ti | O | N | Ca |
| A | 0.24 | 0.03 | 0.59 | 0.006 | 0.0005 | 0.96 | 0.66 | 0.068 | 0.06 | 0.033 | 0.038 | 0.0019 | 0.001 | 0.0009 | 0.0025 | — |
| B | 0.26 | 0.04 | 0.56 | 0.005 | 0.0006 | 1.04 | 0.73 | 0.066 | 0.05 | 0.031 | 0.032 | 0.0022 | 0.002 | 0.0010 | 0.0028 | 0.0011 |
| C | 0.25 | 0.19 | 0.51 | 0.008 | 0.0007 | 0.92 | 0.80 | 0.067 | 0.07 | 0.026 | 0.027 | 0.0027 | 0.003 | 0.0012 | 0.0037 | — |

Here, at least nine test specimens were taken from each steel pipe. The DCB test was conducted in a test bath using a 24° C. aqueous solution of 5 mass % NaCl and 0.5 mass % $CH_3COOH$ saturated with 1 atm (0.1 MPa) hydrogen sulfide gas. After placing a wedge (FIG. 3) in the DCB test specimen, the test specimen was immersed in the test bath for 336 hours under predetermined conditions, and was measured for length a of a crack generated in the specimen while being immersed in the solution. The specimen was also measured for wedge open stress P. From measured values, $K_{ISSC}$ (MPa$\sqrt{m}$) was calculated using the following formula (0).

[Math. 1]

$$K_{ISSC} = \frac{Pa(2\sqrt{3} + 2.38h/a)(B/B_n)^{1/\sqrt{3}}}{Bh^{3/2}} \qquad \text{Formula (0)}$$

In formula (0), h is the arm height (height of each arm) of the DCB test specimen, B is the thickness of the DCB test specimen, and $B_n$ is the web thickness of the DCB test specimen (see FIG. 2). The values specified in method D of NACE TM0177 were used for these variables. From the predicted maximum notch defect and the load applying conditions of the oil country tubular goods, the target value of $K_{ILIMIT}$ was set to be 23.0 MPa$\sqrt{m}$ or more. For calculation of $K_{ILIMIT}$ value, the wedge was used in three different thicknesses, 2.76 mm, 2.89 mm, and 3.02 mm, and each was used for at least three test specimens. A $K_{ILIMIT}$ value was calculated following the procedures described above with reference to FIG. 1, using the calculated $K_{ISSC}$ values. FIG. 4 shows the calculated $K_{ILIMIT}$ values sorted relative to the yield strength (YS) of each test steel pipe. In FIG. 4, the cross represents the result for 1QT material, the open circle represents the result for 2QT material, the open diamond represents the result for 3QT material, and the open square represents the result for DQ-QT material, as will be described later. It was found from the result shown in FIG. 4 that the $K_{ILIMIT}$ value greatly depends on the manufacturing process of the seamless steel pipe, even when the yield strength is nearly the same. Specifically, a trend was observed that the $K_{ILIMIT}$ value was higher for 2QT material (a material quenched and tempered twice) and 3QT material (a material quenched and tempered three times) than for 1QT material (a material quenched and tempered once). However, the heat treatment cost increases and productivity decreases with increasing rounds of quenching and tempering. To investigate further, the present inventors looked at the DQ-QT material, a material simultaneously tested with the other materials, and that was subjected to reheating quenching and tempering after direct quenching (hereinafter, also referred to as DQ, which describes quenching performed immediately after hot rolling, while the steel pipe temperature is still high).

Specifically, various kinds of blocks for hot rolling experiment were taken from the three types of steel pipe materials used to form test pipes. The block was tested in a plate rolling and direct quenching experiment that simulates hot forming and subsequent direct quenching of a seamless steel pipe, using a small-size hot-rolling mill, a cooling device, and a heating furnace. After adjusting the yield strength of the rolled plates to a value equivalent to the C110 grade of the API standards by reheating quenching and tempering, a DCB test specimen was taken from the material, and tested by a DCB test. The test was conducted under the same conditions described above. The $K_{ILIMIT}$ value obtained in the DCB test was examined for any relationship with various rolling conditions. It was found as a result that the $K_{ILIMIT}$ value particularly improves with decreasing heating start temperatures of intermediate heating performed after piercing and elongation rolling and before sizing rolling of the seamless steel pipe.

The present inventors conducted further investigations. FIG. 5 represents seamless steel pipe manufacturing processes. As shown in FIG. 5, the present inventors thought of modifying a traditional seamless steel pipe manufacturing process by adding intermediate cooling before intermediate heating performed after piercing and elongation rolling and before sizing rolling. It was found that what is important in the intermediate cooling is the cooling stop temperature (specifically, the recuperation temperature after the intermediate cooling; described below), and the time before subsequent intermediate heating is started.

To investigate this, the present inventors conducted a plate rolling and direct quenching experiment that simulates hot forming and subsequent direct quenching of a seamless steel pipe, and performed intermediate cooling during plate rolling. In the experiment, the recuperation temperature after intermediate cooling, and the time before start of intermediate heating were varied. Separately, a sample prepared by reheating quenching and tempering of the rolled material was subjected to a DCB test, and the $K_{ILIMIT}$ value obtained in the test was used to find the optimum combination of recuperation temperature after intermediate cooling, and time before start of intermediate heating.

FIG. 7 is a diagram representing $K_{ILIMIT}$ values sorted in the graph of waiting time tW before start of intermediate heating (seconds) plotted against (Tr−Ms) (° C.), a value obtained by subtracting the martensitic transformation temperature Ms (° C.) of a sample from the recuperation temperature Tr (° C.) after intermediate cooling. In FIG. 7, the open circle represents experiment conditions that produced a target $K_{ILIMIT}$ value of 23.0 MPa$\sqrt{m}$ or more, and the cross represents experiment conditions with which the $K_{ILIMIT}$ value was below the target value of 23.0 MPa$\sqrt{m}$. It was found that $K_{ILIMIT}$ cannot satisfy the target value when the recuperation temperature Tr (° C.) after intermediate cooling exceeds (Ms+150° C.), regardless of the waiting time tW before start of intermediate heating. A possible explanation for this observation is that, even with intermediate cooling, transformation (probably bainite transformation) does not take place after the cooling and before start of intermediate heating when the cooling stop temperature (specifically, the recuperation temperature after the intermediate cooling; described below) exceeds (Ms+150° C.). It was also found that $K_{ILIMIT}$ can more easily satisfy the target value as the recuperation temperature Tr after intermediate cooling decreases, even when the waiting time tW before start of intermediate heating is short, as shown in FIG. 7. Presumably, with intermediate cooling, bainite transformation starts when the recuperation temperature Tr after intermediate cooling is (Ms+150° C.) or less, and proceeds during the waiting time before start of intermediate heating, enabling reverse transformation to occur in the subsequent intermediate heating. The resulting refinement of grains appears to be the reason for the improved $K_{ILIMIT}$ value.

Aspects of the present invention were completed on the basis of these findings, and are as follows.

[1] A high-strength seamless steel pipe having a yield strength of 758 MPa or more, and a $K_{ILIMIT}$ value of 23.0 MPa√m or more as an evaluation index of sulfide stress corrosion cracking resistance.

Here, $K_{ILIMIT}$ is a value determined from the intersection between (i) a linear regression line created by a stress intensity factor $K_{ISSC}$ obtained in a DCB (Double Cantilever Beam) test conducted multiple times under different test conditions, and an applied stress intensity factor $K_{Iapplied}$ at the tip of a notch in a test specimen before start of the DCB test, and (ii) a straight line on which $K_{ISSC}$ and $K_{Iapplied}$ are one-to-one.

[2] The high-strength seamless steel pipe according to [1], which has a steel microstructure with a prior austenite grain size of 10.5 or more in terms of a grain size number in compliance with ASTM E112.

[3] The high-strength seamless steel pipe according to [1] or [2], which has a composition that includes, in mass %, C: 0.23 to 0.27%, Si: 0.35% or less, Mn: 0.45 to 0.70%, P: 0.010% or less, S: 0.0010% or less, Cr: 0.80 to 1.20%, Mo: 0.50 to 0.90%, Al: 0.080% or less, Cu: 0.09% or less, Nb: 0.050% or less, V: 0.050% or less, B: 0.0015 to 0.0030%, Ti: 0.005% or less, O: 0.0020% or less, and N: 0.0050% or less, and in which the balance is Fe and incidental impurities.

[4] The high-strength seamless steel pipe according to [3], wherein the composition further includes, in mass %, Ca: 0.0020% or less.

[5] A method for manufacturing the high-strength seamless steel pipe of any one of [1] to [4], the method including:
a step of heating a steel pipe material to a heating temperature in a temperature region of 1,200 to 1,300° C.;
a first hot rolling step of hot rolling the heated steel pipe material by piercing and elongating the steel pipe material with a rolling end temperature of 800° C. or more;
an intermediate cooling step of cooling a raw steel pipe after the first hot rolling step, the raw steel pipe being cooled from a cooling start temperature of 700° C. or more under the conditions that the average cooling rate is 40° C./s or more, and the recuperation temperature Tr of the raw steel pipe at a pipe surface is (Ms+150° C.) or less, where Ms is a martensitic transformation start temperature;
an intermediate heating step of heating the raw steel pipe after the intermediate cooling step, the raw steel pipe being heated to a surface temperature of 800 to 1,000° C. after a lapse of a waiting time tW of 300 seconds or less by being charged into a reheating furnace;
a second hot rolling step of subjecting the raw steel pipe after the intermediate heating step to sizing hot rolling from a temperature equal to or greater than (Ar3+100° C.), where Ar3 is a ferrite transformation start temperature, and ending the hot rolling at a temperature of (Ar3+50° C.) or more;
a direct quenching step of directly quenching the raw steel pipe continuously from the second hot rolling step, the raw steel pipe being quenched from a temperature equal to or greater than (Ar3+10° C.) under the conditions that the average cooling rate is 40° C./s or more, and the cooling stop temperature is 200° C. or less; and
a heat treatment step of subjecting the raw steel pipe after the direct quenching step to at least one run of a heat treatment that quenches the raw steel pipe after reheating to a temperature of 850 to 930° C., and continuously tempers the raw steel pipe by heating to 650 to 730° C.,
the recuperation temperature Tr and the waiting time tW in the intermediate heating step satisfying the following formula (1):

$$(Tr-Ms) \leq 10 + 0.0024 \times (tW)^2 \qquad (1).$$

As used herein, "high strength" means a strength equivalent to at least the C110 grade of the API standards, specifically, strength with a yield strength of 758 MPa or more (110 ksi or more).

A high-strength seamless steel pipe according to aspects of the present invention has excellent sulfide stress corrosion cracking resistance (SSC resistance). Here, "excellent sulfide stress corrosion cracking resistance" means having a $K_{ILIMIT}$ value of 23.0 MPa√m or more as calculated using the method of FIG. 1, using the $K_{ISSC}$ (MPa√m) obtained by varying the wedge thickness in a DCB test conducted according method D of NACE TM0177 with a test bath using a 24° C. aqueous solution of 5 mass % NaCl and 0.5 mass % $CH_3COOH$ saturated with 1 atm (0.1 MPa) hydrogen sulfide gas.

Aspects of the present invention can provide a high-strength seamless steel pipe having a high strength equivalent to at least the C110 grade of the API standards, and excellent sulfide stress corrosion cracking resistance (SSC resistance), specifically, a high $K_{ILIMIT}$ value, in hydrogen sulfide-containing sour environments. Aspects of the present invention can also provide a method for manufacturing such a high-strength seamless steel pipe.

BRIEF DESCRIPTION OF THE DRAWINGS

FIG. 1 is a diagram representing a method for deriving a $K_{ILIMIT}$ value.

FIG. 2 is a diagram representing the shape and dimensions of a DCB test specimen.

FIG. 3 is a diagram representing the shape and dimensions of a wedge used in a DCB test.

FIG. 4 is a diagram representing the relationship between the yield strength (YS) and $K_{ILIMIT}$ value of a seamless steel pipe for different seamless steel pipe manufacturing processes.

FIG. 5 is a diagram comparing a traditional seamless steel pipe manufacturing process, and a seamless steel pipe manufacturing process according to aspects of the present invention.

FIG. 6 is a diagram representing time-dependent temperature changes at the outer surface, the center of wall thickness, and the inner surface of a raw steel pipe as measured by heat transfer calculations of a water cooled raw pipe (raw steel pipe) for seamless steel pipes.

FIG. 7 is a diagram representing the result of the measurement of $K_{ILIMIT}$ values obtained for experiment materials simulating seamless steel pipes and plotted in a graph of recuperation temperature after intermediate water cooling, and waiting time before start of intermediate heating following recuperation.

DETAILED DESCRIPTION OF EMBODIMENTS OF THE INVENTION

The following specifically describes embodiments of the present invention. It is to be noted that the present invention is not limited to the embodiments below.

A high-strength seamless steel pipe according to aspects of the present invention is described first.

A high-strength seamless steel pipe according to aspects of the present invention has a yield strength of 758 MPa or more, and a $K_{ILIMIT}$ value of 23.0 MPa√m or more as an evaluation index of sulfide stress corrosion cracking resistance. Here, $K_{ILIMIT}$ is a value determined from the intersection between (i) a linear regression line created by the stress intensity factor $K_{ISSC}$ obtained in a DCB (Double Cantilever Beam) test conducted multiple times under different test conditions, and the applied stress intensity factor $K_{Iapplied}$ at the tip of a notch in a test specimen before start of the DCB test, and (ii) a straight line on which $K_{ISSC}$ and $K_{Iapplied}$ are one-to-one.

As mentioned above, a high-strength seamless steel pipe according to aspects of the present invention has a high strength equivalent to at least the C110 grade of the API standards (a yield strength of 758 MPa or more), and excellent sulfide stress corrosion cracking resistance (SSC resistance) in sour environments containing hydrogen sulfide. Here, the yield strength is 758 MPa or more, and the $K_{ILIMIT}$ value is 23.0 MPa√m or more following the discussions given above, and detailed descriptions of the reasons for these specific values are omitted. The yield strength is preferably less than 862 MPa. The target value of $K_{ILIMIT}$ is set to be 23.0 MPa√m or more from the predicted maximum notch defect and the load applying conditions of oil country tubular goods. The target value of $K_{ILIMIT}$ is preferably 24.0 MPa√m or more, more preferably 25.0 MPa√m or more.

Preferably, a high-strength seamless steel pipe according to aspects of the present invention has a steel microstructure with a prior austenite grain size of 10.5 or more in terms of a grain size number in compliance with ASTM E112 (hereinafter, referred to as "prior austenite grain size").

A prior austenite grain size of less than 10.5 leads to insufficient grain refinement, and $K_{ILIMIT}$ may fail to satisfy its target value. For this reason, the prior austenite grain size is preferably 10.5 or more. The prior austenite grain size is more preferably 11.0 or more, even more preferably 12.0 or more. From the viewpoint of the limits of grain refinement in actual production, the prior austenite grain size is preferably 17.0 or less.

The prior austenite grain size can be measured using the method described in the Examples of the present invention below.

The following describes the preferred ranges of the composition of the high-strength seamless steel pipe according to aspects of the present invention, along with the reasons for the preferred ranges. In the following, "%" is percent by mass (mass %), unless otherwise specifically stated.

C: 0.23 to 0.27%

C acts to increase steel strength, and is contained in an amount of preferably 0.23% or more to achieve high strength with a yield strength of 758 MPa or more. A carbon content of more than 0.27% considerably hardens the steel, and may lead to deterioration of $K_{ILIMIT}$ value. For this reason, the C content is preferably 0.23 to 0.27%. The C content is more preferably 0.24% or more. The C content is more preferably 0.26% or less.

Si: 0.35% or Less

Si is an element that acts as a deoxidizing agent, and that suppresses abrupt softening during tempering by increasing steel strength in the form of a solid solution in the steel. Si is contained in an amount of preferably 0.01% or more to obtain these effects. A Si content of more than 0.35% may lead to formation of coarse oxide inclusions, and deterioration of $K_{ILIMIT}$ value. For this reason, the Si content is preferably 0.35% or less. The Si content is more preferably 0.01% or more, even more preferably 0.02% or more. The Si content is more preferably 0.20% or less, even more preferably 0.04% or less.

Mn: 0.45 to 0.70%

Mn is an element that increases steel strength by way of improving hardenability, and that acts to fix sulfur by forming MnS with S, and prevent sulfur-induced embrittlement at grain boundaries. In accordance with aspects of the present invention, Mn is contained in an amount of preferably 0.45% or more. A Mn content of more than 0.70% may considerably harden the steel as a result of improved hardenability, and may lead to deterioration of $K_{ILIMIT}$ value. For this reason, the Mn content is preferably 0.45 to 0.70%. The Mn content is more preferably 0.50% or more, even more preferably 0.55% or more. The Mn content is more preferably 0.65% or less, even more preferably 0.60% or less.

P: 0.010% or Less

P may segregate at grain boundaries or other parts of the steel in a solid solution state, and cause defects such as grain boundary embrittlement cracking. In accordance with aspects of the present invention, P is contained preferably in as small an amount as possible, and a P content as low as 0.010% is acceptable. For this reason, the P content is preferably 0.010% or less. The P content is more preferably 0.008% or less, even more preferably 0.006% or less.

S: 0.0010% or Less

Sulfur almost entirely exists as sulfide inclusions in the steel, and may decrease ductility, toughness, and corrosion resistance such as sulfide stress corrosion cracking resistance. Sulfur may partly exist in a solid solution state. In this case, sulfur segregates at grain boundaries and other parts of the steel, and may cause defects such as grain boundary embrittlement cracking. For this reason, in accordance with aspects of the present invention, sulfur is contained preferably in as small an amount as possible. However, excessive reduction of S content leads to high refinement cost. For this reason, in accordance with aspects of the present invention, the S content is preferably 0.0010% or less, a content range in which the adverse effect of this element is tolerable. The S content is more preferably 0.0008% or less, even more preferably 0.0006% or less.

Cr: 0.80 to 1.20%

Cr is an element that contributes to increasing steel strength by way of increasing hardenability, and that improves corrosion resistance. Cr also forms carbides such as $M_3C$, $M_7C_3$, and $M_{23}C_6$ by binding to carbon during tempering, and these carbides, the $M_3C$ carbide in particular, improve temper softening resistance. In this way, Cr reduces strength fluctuations due to tempering, and contributes to improving the yield strength. Cr is contained in an amount of preferably 0.80% or more to achieve a yield strength of 758 MPa or more. A Cr content of more than 1.20% is economically disadvantageous because the effect becomes saturated. For this reason, the Cr content is preferably 0.80 to 1.20%. The Cr content is more preferably 0.90% or more, even more preferably 0.95% or more. The Cr content is more preferably 1.10% or less, even more preferably 1.05% or less.

Mo: 0.50 to 0.90%

Mo is an element that contributes to increasing steel strength by way of increasing hardenability, and that improves corrosion resistance. Molybdenum, particularly in the form of $Mo_2C$ carbides formed through secondary precipitation after tempering, improves temper softening resistance. In this way, molybdenum reduces strength variations due to tempering, and contributes to improving the yield strength. Mo is contained in an amount of preferably 0.50% or more to obtain these effects. A Mo content of more than 0.90% is economically disadvantageous because the effect becomes saturated. For this reason, the Mo content is preferably 0.50 to 0.90%. The Mo content is more preferably 0.60% or more, even more preferably 0.65% or more. The Mo content is more preferably 0.80% or less, even more preferably 0.75% or less.

Al: 0.080% or Less

Al acts as a deoxidizing agent, and contributes to reducing solid solution nitrogen by forming AlN with N. Al is contained in an amount of preferably 0.040% or more to obtain this effect. An Al content of more than 0.080% may increase oxide inclusions, and may lead to deterioration of $K_{ILIMIT}$ value. For this reason, the Al content is preferably 0.080% or less. The Al content is more preferably 0.050% or more. The Al content is more preferably 0.070% or less.

Cu: 0.09% or Less

Cu is an element that acts to improve corrosion resistance. When added in trace amounts, Cu forms dense corrosion products, and suppresses generation and growth of pits, which become initiation points of SSC. In this way, Cu greatly improves sulfide stress corrosion cracking resistance. For this reason, in accordance with aspects of the present invention, Cu is contained in an amount of preferably 0.02% or more. A Cu content of more than 0.09% may lead to decrease of hot workability during the seamless steel pipe manufacturing process. For this reason, the Cu content is preferably 0.09% or less. The Cu content is more preferably 0.03% or more, even more preferably 0.04% or more. The Cu content is more preferably 0.07% or less, even more preferably 0.06% or less.

Nb: 0.050% or Less

Nb is an element that contributes to refinement of γ grains by delaying recrystallization in an austenite (γ) temperature region, and very effectively acts on refinement of substructures (for example, packets, blocks, and laths). Nb is also an element that acts to strengthen steel by forming carbides. Nb is contained in an amount of preferably 0.020% or more to obtain these effects. A Nb content of more than 0.050% promotes formation of coarse precipitates (NbN), and may lead to deterioration of $K_{ILIMIT}$ value. For this reason, the Nb content is preferably 0.050% or less. The Nb content is more preferably 0.025% or more, even more preferably 0.030% or more. The Nb content is more preferably 0.045% or less, even more preferably 0.040% or less. Here, "packet" is defined as a region formed by aggregates of laths having parallel faces with the same habit plane, whereas "block" is formed by aggregates of parallel laths of the same orientation.

V: 0.050% or Less

V is an element that forms carbides or nitrides, and that contributes to strengthening the steel. V is contained in an amount of preferably 0.020% or more to obtain these effects. A V content of more than 0.050% results in coarsening of V carbides, which become initiation points of sulfide stress corrosion cracking, and decreases the $K_{ILIMIT}$ value, rather than increasing it. For this reason, the V content is preferably 0.050% or less. The V content is more preferably 0.025% or more, even more preferably 0.030% or more. The V content is more preferably 0.045% or less, even more preferably 0.040% or less.

B: 0.0015 to 0.0030%

B is an element that contributes to improving hardenability, when contained in trace amounts. In accordance with aspects of the present invention, B is contained in an amount of preferably 0.0015% or more. A boron content of more than 0.0030% is economically disadvantageous because the effect becomes saturated, or the desired effect cannot be expected as a result of formation of iron boride (Fe—B). For this reason, the B content is preferably 0.0015 to 0.0030%. The B content is more preferably 0.0016% or more, even more preferably 0.0018% or more. The B content is more preferably 0.0027% or less, even more preferably 0.0023% or less.

Ti: 0.005% or Less

Ti forms nitrides, and may cause deterioration of $K_{ILIMIT}$ value as a result of coarse titanium nitride becoming an initiation point of SSC. For this reason, the Ti content is preferably 0.005% or less. The Ti content is more preferably 0.003% or less. The Ti content is more preferably 0.002% or less.

O (Oxygen): 0.0020% or Less

In the steel, O (oxygen) exists as incidental impurities in the form of oxides of elements such as Al and Si. Oxygen may cause deterioration of $K_{ILIMIT}$ value when coarse oxides are present in large amounts. For this reason, the O (oxygen) content is preferably 0.0020% or less, a content range in which the adverse effect of this element is tolerable. The O (oxygen) content is more preferably 0.0015% or less, even more preferably 0.0010% or less.

N: 0.0050% or Less

N represents incidental impurities of the steel, and forms MN-type precipitates by binding to nitride forming elements such as Al, Nb, and Ti. The excess nitrogen from formation of these nitrides binds to boron and forms BN precipitates. Because this takes away the hardenability improving effect produced by adding boron, the amount of excess nitrogen should preferably be reduced as much as possible, preferably to 0.0050% or less. The N content is more preferably 0.0040% or less, even more preferably 0.0030% or less.

In the composition of the components above, the balance is Fe and incidental impurities.

Preferably, a high-strength seamless steel pipe according to aspects of the present invention contains the foregoing components as the basic composition. The properties desired in accordance with aspects of the present invention can be obtained with the preferred elements above. Optionally, 0.0020% or less of calcium may be contained for further improvement of strength and SSC resistance.

Ca: 0.0020% or Less

Ca is effective at preventing clogging of nozzles during continuous casting, and is contained in an amount of desirably 0.0005% or more to obtain the desired effect. As an alternative to Mn, Ca fixes sulfur by forming CaS with S, and prevents the grain boundary embrittlement caused by sulfur. Unlike MnS, which is ductile, calcium finely disperses in steel without elongating during hot rolling, and improves sulfide stress corrosion cracking resistance. However, Ca forms oxide nonmetallic inclusions by combining with Al, and, when contained in an amount of particularly more than 0.0020%, calcium forms such inclusions in large amounts, and causes deterioration of $K_{ILIMIT}$ value. For this reason, Ca, when contained, is contained in an amount of preferably 0.0020% or less. The Ca content is more preferably 0.0007% or more, even more preferably 0.0009% or more. The Ca content is more preferably 0.0015% or less, even more preferably 0.0012% or less.

The following describes a high-strength seamless steel pipe manufacturing method of an embodiment of the present invention.

A high-strength seamless steel pipe manufacturing method according to aspects of the present invention includes:
- a step of heating a steel pipe material of the foregoing specific composition to a heating temperature in a temperature region of 1,200 to 1,300° C.;
- a first hot rolling step of hot rolling the heated steel pipe material by piercing and elongating the steel pipe material with a rolling end temperature of 800° C. or more;
- an intermediate cooling step of cooling a raw steel pipe after the first hot rolling step, the raw steel pipe being cooled from a cooling start temperature of 700° C. or more under the conditions that the average cooling rate is 40° C./s or more, and the recuperation temperature Tr of the raw steel pipe at a pipe surface is (Ms+150° C.) or less, where Ms is the martensitic transformation start temperature calculated from the formula (A) below;
- an intermediate heating step of heating the raw steel pipe after the intermediate cooling step, the raw steel pipe being heated to a surface temperature of 800 to 1,000° C. after a lapse of a waiting time tW of 300 seconds or less by being charged into a reheating furnace;
- a second hot rolling step of subjecting the raw steel pipe after the intermediate heating step to sizing hot rolling from a temperature equal to or greater than (Ar3+100° C.), where Ar3 is the ferrite transformation start temperature calculated from the formula (B) below, and ending the hot rolling at a temperature of (Ar3+50° C.) or more;
- a direct quenching step of directly quenching the raw steel pipe continuously from the second hot rolling step, the raw steel pipe being quenched from a temperature equal to or greater than (Ar3+10° C.) under the conditions that the average cooling rate is 40° C./s or more, and the cooling stop temperature is 200° C. or less; and
- a heat treatment step of subjecting the raw steel pipe after the direct quenching step to at least one run of a heat treatment that quenches the raw steel pipe after reheating to a temperature of 850 to 930° C., and subsequently tempers the raw steel pipe by heating to 650 to 730° C., the recuperation temperature Tr and the waiting time tW in the intermediate heating step satisfying the following formula (1).

$$Ms = 545 - 330 \times (\%C) - 7 \times (\%Si) - 23 \times (\%Mn) - 14 \times (\%Cr) - 5 \times (\%Mo) + 2 \times (\%Al) - 13 \times (\%Cu) - 4 \times (\%Nb) + 4 \times (\%V) + 3 \times (\%Ti) \quad (A)$$

$$Ar3 = 910 - 273 \times (\%C) - 74 \times (\%Mn) - 56 \times (\%Ni) - 16 \times (\%Cr) - 9 \times (\%Mo) - 5 \times (\%Cu) \quad (B)$$

$$(Tr - Ms) \leq 10 + 0.0024 \times (tW)^2 \quad (1)$$

In the formulae (A) and (B), the atomic symbol represents the content of the element in mass %, and the content is zero (0) for elements that are not contained.

In accordance with aspects of the present invention, the steelmaking process is not particularly limited. For example, a molten steel of the foregoing composition may be made by using a known steelmaking process such as by using a converter, an electric furnace, or a vacuum melting furnace. For cost considerations, the molten steel is cast preferably by continuous casting. In continuous casting, the molten steel may be continuously cast into a common cast piece having a rectangular cross section such as a slab or a bloom, or may be continuously cast directly into a cast piece having a circular cross section, which is more suited for hot rolling into a seamless steel pipe. In the case of continuous casting into a cast piece having a rectangular cross section, the cast piece having a rectangular cross section is heated to a predetermined heating temperature, and hot rolled into a steel pipe material having a circular cross section.

The following describes a hot process of forming a seamless steel pipe of a predetermined shape using a steel pipe material obtained after billet rolling or a cast piece heat treatment. In accordance with aspects of the present invention, temperatures including heating temperatures of steel pipe material and raw steel pipe, hot rolling temperature, cooling start temperature, cooling stop temperature, and heat treatment temperature are surface temperatures of materials such as a steel pipe material and a raw steel pipe (the outer surface of a pipe in the case of a raw steel pipe). These temperatures can be measured using a radiation thermometer or the like.

Steel Pipe Material Heating Step

Heating Temperature: 1,200 to 1,300° C.

In order to form a seamless steel pipe of a predetermined shape by hot rolling, a steel pipe material is heated to the austenitic phase region of the steel. When the steel pipe material heating temperature is less than 1,200° C., severe internal defects occur during piercing, and defects detected in a nondestructive test after the final steel-pipe heat treatment cannot be satisfactory even after repair. From the viewpoint of preventing defects, the steel pipe material heating temperature is 1,200° C. or more. When the steel pipe material heating temperature is more than 1,300° C., severe coarsening of austenite grains occurs in the steel. The impact of this coarsening remains even after the subsequent hot rolling, cooling, and heat treatment processes, and causes deterioration of $K_{ILIMIT}$ value. The upper limit of steel pipe material heating temperature is therefore 1,300° C.

First Hot Rolling Step of Steel Pipe (Pierce Rolling and Elongation Rolling Step)

Rolling End Temperature: 800° C. or More

In the first hot rolling of a seamless steel pipe, the process starts with pierce rolling, followed subsequently by elongation rolling. When a raw steel pipe temperature at the end of elongation rolling is less than 800° C., the high-temperature ductility of steel decreases, and defects occur in the outer surface during hot rolling. This has adverse effects on the transformation behavior of steel during the intermediate cooling described below, and causes deterioration of $K_{ILIMIT}$ value. For this reason, the rolling end temperature of first hot rolling is 800° C. or more.

The rolling start temperature of first hot rolling is not particularly limited. However, from the viewpoint of preventing coarsening of austenite grains, the rolling start temperature of first hot rolling is preferably 1,280° C. or less. From the viewpoint of preventing generation of surface defects during hot rolling, the rolling start temperature of first hot rolling is preferably 1,150° C. or more.

Intermediate Cooling Step of Raw Steel Pipe

Cooling Start Temperature: 700° C. or More

Intermediate cooling, when appropriately performed after the elongation rolling in the first hot rolling, enables the raw steel pipe to undergo bainite transformation, and reverse transformation occurs in the intermediate heating performed after intermediate cooling. This greatly improves the $K_{ILIMIT}$ value. When the intermediate cooling starts at a temperature of less than 700° C., the steel undergoes ferrite transformation before intermediate cooling, and the reverse transformation behavior of the steel in subsequent intermediate heating is adversely affected. This leads to deterioration of $K_{ILIMIT}$ value. The cooling start temperature is therefore 700° C. or more.

Average Cooling Rate: 40° C./s or More

In order to enable bainite transformation in the raw steel pipe, the average cooling rate of intermediate cooling is 40° C./s or more. As used herein, "average cooling rate" means the average cooling rate at the outer surface of the raw steel pipe in a temperature range of from 700° C. to (Ms+150° C.) at the outer surface of the raw steel pipe, where Ms is the martensitic transformation start temperature calculated using the formula (A) below. With an average cooling rate of less than 40° C./s, it is not possible to start bainite transformation throughout the wall thickness of the raw steel pipe. In this case, a region with no bainite transformation has the same transformation behavior as in the ordinary DQ-QT process, and the $K_{ILIMIT}$ value cannot improve. For this reason, the average cooling rate of intermediate cooling is 40° C./s or more, preferably 50° C./s or more.

The upper limit of average cooling rate is not particularly limited. However, the average cooling rate is preferably 100° C./s or less because it is extremely difficult with excessively high cooling rates to control the recuperation temperature of the cooled raw steel pipe (described later) within the predetermined temperature region.

The method of cooling the raw steel pipe is not particularly limited. It is preferable, however, to cool the raw steel pipe by showering water or applying mist to the outer surface of the pipe so that intermediate cooling can be performed after the raw steel pipe discharges from the hot rolling equipment and before the pipe enters the intermediate heating furnace, and that the recuperation temperature of the cooled raw steel pipe can be more easily controlled within the predetermined temperature region.

Recuperation Temperature Tr: (Ms+150° C.) or Less

For bainite transformation of the raw steel pipe, the recuperation temperature Tr of the raw steel pipe immediately after intermediate cooling needs to be (Ms+150° C.) or less (Ms is the martensitic transformation temperature of the steel) so that at least bainite transformation starts throughout the wall thickness of the raw steel pipe.

FIG. 6 is a diagram representing time-dependent temperature changes at the outer surface, the center of wall thickness, and the inner surface of a raw steel pipe as measured by heat transfer calculations of a 28 mm-thick raw pipe (raw steel pipe) for seamless steel pipes after cooling from 800° C. For calculations, the raw steel pipe was cooled by showering water to the outer surface. The outer surface of the raw steel pipe recuperates after a transient temperature drop. The recuperation temperature then converges into about the same temperatures measured at the wall thickness center and at the inner surface. It can be said from this that the temperature at the center of the wall thickness, and the temperature at the inner surface of the steel pipe material have decreased to the same temperature region as the outer surface temperature when the recuperation temperature at the outer surface of the steel pipe material has decreased to the predetermined temperature region. The $K_{ILIMIT}$ value cannot achieve its target value of 23.0 MPa√m (FIG. 7) when the recuperation temperature Tr is above (Ms+150° C.). The recuperation temperature Tr is therefore (Ms+150° C.) or less, preferably (Ms+100° C.) or less, more preferably (Ms+80° C.) or less. The martensitic transformation start temperature Ms can be calculated from the following formula (A).

$$Ms = 545 - 330 \times (\%C) - 7 \times (\%Si) - 23 \times (\%Mn) - 14 \times (\%Cr) - 5 \times (\%Mo) + 2 \times (\%Al) - 13 \times (\%Cu) - 4 \times (\%Nb) + 4 (\%V) + 3 \times (\%Ti) \quad (A)$$

In the formula (A), the atomic symbol represents the content of the element in mass %, and the content is zero (0) for elements that are not contained.

The lower limit of recuperation temperature Tr is not particularly limited. However, from the viewpoint of economy, the recuperation temperature Tr is preferably equal to or greater than the martensitic transformation start temperature (Ms) because the fuel consumption rate in the subsequent intermediate heating step increases as the recuperation temperature Tr decreases. The recuperation temperature Tr is more preferably equal to or greater than (Ms+30° C.). It should be noted here that the $K_{ILIMIT}$ value can still achieve the target value of 23.0 MPa√m even when the recuperation temperature Tr actually becomes equal to or less than martensitic transformation start temperature (Ms).

Intermediate Heating Step of Raw Steel Pipe

Waiting Time tW Before Start of Intermediate Heating

As discussed above, of importance is the cooling stop temperature of the intermediate cooling step (specifically, the recuperation temperature after intermediate cooling), and the time before start of the subsequent intermediate heating step. The present inventors found that the recuperation temperature Tr immediately after intermediate cooling, and the waiting time tW before start of intermediate heating have combinations with which the $K_{ILIMIT}$ value can achieve the target value of 23.0 MPa√m. Specifically, the waiting time tW before start of intermediate heating needs to be longer for higher recuperation temperatures Tr. Conversely, shorter waiting times tW are sufficient for lower recuperation temperatures Tr. Referring to FIG. 7, the present inventors obtained the formula (1) by approximating a quadratic curve for the borderline of target $K_{ILIMIT}$ value, using recuperation temperatures Tr and waiting times tW obtained in a simulation experiment.

$$(Tr - Ms) \leq 10 + 0.0024 \times (tW)^2 \quad (1)$$

When the value of (Tr−Ms) is smaller than the value on the right-hand side of the formula (1), bainite transformation can almost fully proceed to completion by the time intermediate heating is started, and reverse transformation can take place in the subsequent intermediate heating, enabling the $K_{ILIMIT}$ value to achieve the target value of 23.0 MPa√m through grain refinement of grains. From the viewpoint of production efficiency, the waiting time tW before start of intermediate heating is 300 seconds or less, preferably 250 seconds or less, more preferably 200 seconds or less. The lower limit of waiting time tW before start of intermediate heating is not particularly limited. However, considering the restrictions on the equipment used for processes from intermediate cooling to intermediate heating, the waiting time tW is preferably 30 seconds or more, more preferably 100 seconds or more, provided that formula (1) is satisfied.

Intermediate Heating Temperature: 800 to 1,000° C.

Intermediate heating is performed to promote refinement of grains through reverse transformation of the raw steel pipe subjected to intermediate cooling, and to apply supplemental heat to the raw steel pipe for sizing rolling of a seamless steel pipe. When the intermediate heating temperature is less than 800° C., the raw steel pipe keeps undergoing reverse transformation, and grains are not refined as intended. Because this leads to decrease of $K_{ILIMIT}$ value, the intermediate heating temperature is 800° C. or more. The intermediate heating temperature is 1,000° C. or less because severe coarsening, rather than refinement, of grains occurs as a result of grain growth when the intermediate heating temperature is above 1,000° C.

Second Hot Rolling Step of Steel Pipe (Sizing Rolling Step)

Rolling Start Temperature: (Ar3+100° C.) or More

The intermediate heating is followed by sizing rolling (second hot rolling), a final hot rolling step. The rolling causes grain mixing in the microstructure, and decreases the $K_{ILIMIT}$ value when the start temperature of sizing rolling is less than (Ar3+100° C.), where Ar3 is the ferrite transformation start temperature. For this reason, the rolling start temperature of second hot rolling is (Ar3+100° C.) or more. The ferrite transformation start temperature (Ar3) can be calculated from the following formula (B).

$$Ar3=910-273\times(\%C)-74\times(\%Mn)-56\times(\%Ni)-16\times(\%Cr)-9\times(\%Mo)-5\times(\%Cu) \quad (B)$$

In the formula (B), the atomic symbol represents the content of the element in mass %, and the content is zero (0) for elements that are not contained.

The upper limit of the rolling start temperature of second hot rolling is not particularly limited. However, from the viewpoint of production efficiency, the rolling start temperature of second hot rolling is preferably 1,000° C. or less.

Rolling End Temperature: (Ar3+50° C.) or More

The rolling end temperature of second hot rolling is (Ar3+50° C.) or more because the rolling causes grain mixing in the microstructure, and decreases the $K_{ILIMIT}$ value when the end temperature of sizing rolling is less than (Ar3+50° C.).

The upper limit of the rolling end temperature of second hot rolling is not particularly limited, and is preferably 950° C. or less.

Direct Quenching Step

Direct Quenching Start Temperature: (Ar3+10° C.) or More

The sizing rolling (second hot rolling) is followed by direct quenching (DQ) of raw steel pipe. When the start temperature of direct quenching is less than (Ar3+10° C.), ferrite transformation occurs during direct quenching, and the effect of direct quenching becomes insufficient. For this reason, the start temperature of direct quenching is (Ar3+10° C.) or more.

The upper limit of the start temperature of the direct quenching step is not particularly limited, and is preferably 900° C. or less.

Average Cooling Rate: 40° C./s or More

The average cooling rate of direct quenching is 40° C./s or more because the effect of direct quenching becomes insufficient when the average cooling rate of direct quenching is less than 40° C./s. The average cooling rate of direct quenching is preferably 50° C./s or more. As used herein, "average cooling rate" means the average cooling rate at the outer surface of the raw steel pipe in a temperature range of from (Ar3+10° C.) to 200° C. at the outer surface of the raw steel pipe.

The upper limit of average cooling rate is not particularly limited. However, from the viewpoint of preventing hardening cracking during cooling, the average cooling rate is preferably 100° C./s or less.

Cooling Stop Temperature: 200° C. or Less

The cooling stop temperature of direct quenching is 200° C. or less because the effect of direct quenching becomes insufficient when the cooling stop temperature is higher than 200° C. The cooling stop temperature of direct quenching is preferably 150° C. or less, more preferably 100° C. or less.

The lower limit of cooling stop temperature is not particularly limited. However, from the viewpoint of cooling efficiency, the cooling stop temperature is preferably at least a room temperature, more preferably 50° C. or more. The method of cooling in direct quenching is not particularly limited, and cooling may be achieved by, for example, immersing the raw steel pipe in a water tank, showering water from inside and outside of the raw steel pipe, or applying mist. Any of these methods may be used, as long as the specified average cooling rate can be achieved.

Heat Treatment Step

Quenching Reheating Temperature: 850 to 930° C.

The direct quenching step is followed by quenching that reheats the raw steel pipe, in order to adjust the raw steel pipe to a strength equivalent to grade C110 of the API standards. When the quenching reheating temperature is less than 850° C., the austenite transformation of raw steel pipe does not fully proceed to completion, and the untransformed region causes decrease of strength. For this reason, the quenching reheating temperature is 850° C. or more, preferably 870° C. or more. When the quenching reheating temperature is more than 930° C., coarsening of grains occurs, and the $K_{ILIMIT}$ value decreases. For this reason, the quenching reheating temperature is 930° C. or less, preferably 900° C. or less.

The method of cooling in reheating quenching is not particularly limited, as with the case of direct quenching. For example, cooling may be achieved using any method, including immersing the raw steel pipe in a water tank, showering water from inside and outside of the raw steel pipe, and applying mist.

Tempering temperature: 650 to 730° C.

The reheating quenching is followed by tempering, in order to adjust the raw steel pipe to a strength equivalent to grade C110 of the API standards. When the tempering temperature is less than 650° C., the steel pipe strength overly increases, and the $K_{ILIMIT}$ value decreases. For this reason, the tempering temperature is 650° C. or more, preferably 680° C. or more. When the tempering temperature is more than 730° C., reverse transformation occurs in parts of the steel, and the strength greatly decreases. For this reason, the tempering temperature is 730° C. or less, preferably 710° C. or less.

The reheating quenching and tempering (QT) is performed at least once. The reheating quenching and tempering may be performed two times or more to obtain even higher $K_{ILIMIT}$ values.

EXAMPLES

Aspects of the present invention are described below in greater detail through Examples. It is to be noted that the present invention is not limited by the following Examples.

In the steels of the compositions shown in Table 2, steels A, B, and C were made using a converter steelmaking process, and cast into bloom cast pieces by continuous casting. In Table 2, the symbol "-" means that the element was not intentionally added, meaning that the element may be absent (0%), or may be incidentally present. The bloom cast piece was hot rolled into a steel pipe material having a circular cross section, and the steel pipe material was machined to fabricate a block for hot rolling experiment. For the other steels, blocks for hot rolling experiment were produced using a vacuum melting furnace. These were subjected to hot plate rolling carried out as a simulation of hot rolling, intermediate cooling, intermediate heating, hot rolling, and direct quenching of a seamless steel pipe, using a small-size rolling mill, a cooling device, and a heating furnace. The plate thicknesses of rolled materials, and the heating, rolling, and cooling conditions are as shown in Table 3-1 and Table 3-2. The temperature of the plate of rolled material was measured with a thermocouple embedded in the surface at one side of the rolled material. The hot rolled steel plates were then subjected to a quenching and tempering heat treatment using the reheating conditions shown in Table 3-1 and Table 3-2.

From the heat treated material, a JIS 14A round-rod tensile test specimen was taken in compliance with JIS Z2241 (2011). The test specimen was used for an ordinary temperature tensile test conducted according to JIS Z2241, and the yield strength (YS) of the heat treated material was measured.

In order to confirm refinement of grains, a sample for microscopy was taken from the same heat treated material. The sample was polished to a mirror finish, and etched with a picral solution (a picric acid-ethanol mixture). After revealing the prior austenite grain boundary, micrographs of four randomly selected fields were taken using a light microscope at 1,000 times magnification. The grain size number of prior austenite grains photographed by using the intercept method was then measured in compliance with JIS G0551 (2013). The size of prior austenite grains (prior austenite grain size) is measured as a grain size number in compliance with ASTM E112.

For evaluation of $K_{ILIMIT}$ value, a DCB test specimen measuring 9.5 mm in thickness, 25.4 mm in width, and 101.6 mm in length was taken according to method D of NACE TM0177. Here, a total of nine DCB test specimens were taken from each sample, and subjected to a DCB test. The DCB test was carried out in a test bath containing a 24° C. aqueous solution of 5 mass % NaCl and 0.5 mass % $CH_3COOH$ saturated with 1 atm (0.1 MPa) hydrogen sulfide gas. After placing a wedge, the DCB test specimen was immersed in the test bath for 336 hours under predetermined conditions, and was measured for length a of a crack generated in the DCB test specimen while being immersed in the solution. The specimen was also measured for wedge open stress P. $K_{ISSC}$ (MPa√m) was then calculated using the following formula (0).

[Math. 2]

$$K_{ISSC} = \frac{Pa(2\sqrt{3} + 2.38h/a)(B/B_n)^{1/\sqrt{3}}}{Bh^{3/2}} \quad \text{Formula (0)}$$

In formula (0), h is the arm height (height of each arm) of the DCB test specimen, B is the thickness of the DCB test specimen, and Bn is the web thickness of the DCB test specimen. These are values specified in method D of NACE TM0177. From the predicted maximum notch defect and the load applying conditions of oil country tubular goods, the target value of $K_{ILIMIT}$ was set to be 23.0 MPa√m or more. For calculation of $K_{ILIMIT}$ value, the wedge was used in three different thicknesses, 2.76 mm, 2.89 mm, and 3.02 mm, and each was used for at least three test specimens. A $K_{ILIMIT}$ value was calculated following the procedures described with reference to FIG. 1, using the calculated $K_{ISSC}$ values.

The yield strengths and $K_{ILIMIT}$ values of the heat treated materials are presented in Table 4-1 and Table 4-2. The yield strength falls within the range according to aspects of the present invention when it is 758 MPa or more. The $K_{ILIMIT}$ value falls within the range according to aspects of the present invention when it is 23.0 MPa√m or more. The $K_{ILIMIT}$ value is preferably 24.0 MPa√m or more, more preferably 25.0 MPa√m or more.

TABLE 2

| Steel No. | Composition (mass %) | | | | | | | | | | | | | | | |
|---|---|---|---|---|---|---|---|---|---|---|---|---|---|---|---|---|
| | C | Si | Mn | P | S | Cr | Mo | Al | Cu | Nb | V | B | Ti | O | N | Ca |
| A | 0.24 | 0.03 | 0.59 | 0.006 | 0.0005 | 0.96 | 0.66 | 0.068 | 0.06 | 0.033 | 0.038 | 0.0019 | 0.001 | 0.0009 | 0.0025 | — |
| B | 0.26 | 0.04 | 0.56 | 0.005 | 0.0006 | 1.04 | 0.73 | 0.066 | 0.05 | 0.031 | 0.032 | 0.0022 | 0.002 | 0.0010 | 0.0028 | 0.0011 |
| C | 0.25 | 0.19 | 0.51 | 0.008 | 0.0007 | 0.92 | 0.80 | 0.067 | 0.07 | 0.026 | 0.027 | 0.0027 | 0.003 | 0.0012 | 0.0037 | — |
| D | 0.26 | 0.11 | 0.65 | 0.007 | 0.0008 | 1.09 | 0.62 | 0.052 | 0.03 | 0.044 | 0.025 | 0.0016 | 0.003 | 0.0014 | 0.0035 | 0.0014 |
| E | 0.23 | 0.34 | 0.69 | 0.009 | 0.0009 | 1.18 | 0.52 | 0.078 | 0.02 | 0.049 | 0.021 | 0.0015 | 0.004 | 0.0018 | 0.0044 | — |
| F | 0.27 | 0.01 | 0.46 | 0.010 | 0.0007 | 0.81 | 0.89 | 0.041 | 0.08 | 0.022 | 0.048 | 0.0029 | 0.005 | 0.0009 | 0.0027 | 0.0017 |
| G | 0.21 | 0.30 | 0.68 | 0.010 | 0.0009 | 1.19 | 0.88 | 0.077 | 0.02 | 0.048 | 0.024 | 0.0022 | 0.002 | 0.0008 | 0.0026 | — |
| H | 0.24 | 0.33 | 0.43 | 0.009 | 0.0010 | 1.15 | 0.89 | 0.079 | 0.03 | 0.047 | 0.022 | 0.0019 | 0.003 | 0.0009 | 0.0029 | — |
| I | 0.23 | 0.34 | 0.68 | 0.010 | 0.0010 | 0.74 | 0.88 | 0.078 | 0.07 | 0.047 | 0.023 | 0.0017 | 0.002 | 0.0011 | 0.0031 | — |
| J | 0.24 | 0.35 | 0.67 | 0.010 | 0.0009 | 1.17 | 0.39 | 0.077 | 0.05 | 0.046 | 0.024 | 0.0018 | 0.002 | 0.0010 | 0.0028 | — |
| K | 0.23 | 0.35 | 0.66 | 0.009 | 0.0008 | 1.18 | 0.87 | 0.078 | 0.02 | 0.048 | 0.022 | 0.0011 | 0.003 | 0.0009 | 0.0033 | — |
| L | 0.27 | 0.02 | 0.47 | 0.009 | 0.0008 | 0.82 | 0.88 | 0.043 | 0.09 | 0.020 | 0.050 | 0.0028 | 0.005 | 0.0016 | 0.0047 | 0.0002 |

TABLE 3-1

| Steel No. | Sample No. | Thickness (mm) | Ms (°C) | Ar3 (°C) | Heating temp. (°C) | First hot rolling Start temp. (°C) | First hot rolling End temp. (°C) | Intermediate cooling Start temp. (°C) | Intermediate cooling Average cooling rate (°C/s) | Intermediate cooling Tr (°C) | Intermediate heating tW (sec) | Intermediate heating Surface temp. (°C) | Tr-Ms | Value on right-hand side of formula (1) | Second hot rolling Start temp. (°C) | Second hot rolling End temp. (°C) | DQ Start temp. (°C) | DQ Average cooling rate (°C) | DQ End temp. (°C) | Reheating heat treatment Q1 (°C) | Reheating heat treatment T1 (°C) | Reheating heat treatment Q2 (°C) | Reheating heat treatment T2 (°C) | Remarks |
|---|---|---|---|---|---|---|---|---|---|---|---|---|---|---|---|---|---|---|---|---|---|---|---|---|
| A | A1 | 28 | 435 | 779 | 1250 | 1200 | 1129 | 1100 | 52 | 467 | 182 | 900 | 32 | 89 | 880 | 842 | 803 | 54 | 59 | 890 | 685 | — | — | PE |
| A | A2 | 28 | 435 | 779 | 1210 | 1155 | 1043 | 1010 | 54 | 488 | 139 | 900 | 53 | 56 | 880 | 839 | 799 | 55 | 63 | 885 | 690 | — | — | PE |
| A | A3 | 28 | 435 | 779 | 1210 | 1160 | 1050 | 1015 | 53 | 506 | 199 | 920 | 71 | 105 | 890 | 855 | 805 | 56 | 81 | 899 | 680 | 887 | 680 | PE |
| B | B1 | 16 | 427 | 774 | 1230 | 1180 | 1100 | 1041 | 64 | 495 | 179 | 920 | 68 | 87 | 875 | 826 | 789 | 68 | 99 | 881 | 700 | — | — | PE |
| B | B2 | 16 | 427 | 774 | 1230 | 1180 | 1104 | 1051 | 65 | 479 | 194 | 900 | 52 | 100 | 877 | 828 | 785 | 67 | 100 | 880 | 705 | — | — | PE |
| B | B3 | 25 | 427 | 774 | 1230 | 1180 | 1103 | 1047 | 64 | 503 | 198 | 920 | 76 | 104 | 880 | 829 | 794 | 68 | 98 | 900 | 680 | 879 | 710 | PE |
| C | C1 | 28 | 432 | 782 | 1270 | 1220 | 955 | 937 | 54 | 449 | 60 | 950 | 17 | 19 | 920 | 887 | 844 | 52 | 145 | 900 | 695 | — | — | PE |
| C | C2 | 28 | 432 | 782 | 1270 | 1220 | 949 | 928 | 55 | 489 | 155 | 945 | 57 | 68 | 910 | 878 | 833 | 54 | 148 | 900 | 700 | — | — | PE |
| C | C3 | 28 | 432 | 782 | 1290 | 1240 | 967 | 945 | 54 | 521 | 210 | 950 | 89 | 116 | 915 | 880 | 848 | 53 | 150 | 900 | 695 | — | — | PE |
| D | D1 | 25 | 425 | 768 | 1250 | 1210 | 1140 | 1110 | 53 | 507 | 224 | 900 | 82 | 130 | 870 | 820 | 779 | 54 | 99 | 900 | 680 | — | — | PE |
| D | D2 | 25 | 432 | 768 | 1210 | 1160 | 1068 | 1035 | 55 | 515 | 245 | 910 | 90 | 154 | 880 | 825 | 788 | 54 | 101 | 900 | 695 | — | — | PE |
| E | E1 | 25 | 432 | 772 | 1220 | 1160 | 1050 | 1025 | 49 | 533 | 255 | 890 | 101 | 166 | 875 | 824 | 785 | 58 | 188 | 890 | 670 | — | — | PE |
| E | E2 | 25 | 432 | 772 | 1200 | 1150 | 1085 | 1040 | 46 | 454 | 277 | 900 | 22 | 194 | 880 | 825 | 782 | 56 | 175 | 920 | 715 | — | — | PE |
| E | E3 | 32 | 432 | 772 | 1200 | 1000 | 808 | 722 | 42 | 482 | 231 | 905 | 50 | 138 | 880 | 831 | 797 | 46 | 161 | 925 | 700 | — | — | PE |
| E | E4 | 25 | 432 | 772 | 1200 | 1000 | 821 | 703 | 59 | 499 | 226 | 910 | 67 | 133 | 885 | 826 | 785 | 55 | 144 | 920 | 710 | — | — | PE |
| E | E5 | 32 | 432 | 772 | 1230 | 1155 | 1067 | 1067 | 44 | 504 | 249 | 880 | 72 | 159 | 873 | 824 | 793 | 44 | 137 | 930 | 695 | — | — | PE |
| F | F1 | 25 | 429 | 781 | 1240 | 1200 | 1120 | 1095 | 47 | 566 | 251 | 980 | 137 | 161 | 945 | 913 | 872 | 55 | 181 | 860 | 675 | — | — | PE |
| F | F2 | 25 | 429 | 781 | 1220 | 1165 | 1045 | 1020 | 48 | 448 | 262 | 970 | 19 | 175 | 935 | 899 | 851 | 58 | 184 | 865 | 712 | — | — | PE |
| G | G1 | 25 | 437 | 775 | 1220 | 1160 | 1044 | 1020 | 53 | 467 | 100 | 900 | 30 | 34 | 875 | 827 | 788 | 57 | 54 | 890 | 650 | — | — | CE |
| H | H1 | 25 | 433 | 786 | 1220 | 1165 | 1050 | 1025 | 55 | 470 | 125 | 900 | 37 | 48 | 890 | 839 | 799 | 56 | 53 | 890 | 650 | — | — | CE |
| I | I1 | 25 | 435 | 777 | 1220 | 1160 | 1042 | 1021 | 54 | 466 | 99 | 900 | 31 | 34 | 880 | 828 | 791 | 54 | 51 | 890 | 650 | — | — | CE |
| J | J1 | 25 | 429 | 772 | 1225 | 1170 | 1055 | 1033 | 56 | 471 | 133 | 900 | 42 | 52 | 885 | 831 | 794 | 56 | 55 | 890 | 650 | — | — | CE |
| K | K1 | 25 | 430 | 772 | 1225 | 1175 | 1060 | 1041 | 54 | 462 | 107 | 900 | 32 | 37 | 885 | 833 | 801 | 55 | 53 | 890 | 650 | — | — | CE |
| L | L1 | 25 | 428 | 780 | 1220 | 1160 | 1050 | 1022 | 53 | 512 | 194 | 900 | 84 | 100 | 890 | 836 | 799 | 56 | 51 | 890 | 680 | — | — | CE |

*1 Underline means outside of the range of the present invention
*2 Ms = 545 − 330 × (%C) − 7 × (%Si) − 23 × (%Mn) − 14 × (%Cr) − 5 × (%Mo) + 2 × (%Al) − 13 × (%Cu) − 4 × (%Nb) + 4 × (%V) + 3 × (%Ti)
*3 Ar3 = 910 − 273 × (%C) − 74 × (%Mn) − 56 × (%Ni) − 16 × (%Cr) − 9 × (%Mo) − 5 × (%Cu)
*4 (Tr − Ms) ≤ 10 + 0.0024 × (tW)² ... (1)

PE: Present Example,
CE: Comparative Example

TABLE 3-2

| Steel No. | Sample No. | Thickness (mm) | Ms (°C.) | Ar3 (°C.) | Heating temp. (°C.) | First hot rolling Start temp. (°C.) | First hot rolling End temp. (°C.) | Intermediate cooling Start temp. (°C.) | Average cooling rate (°C/s) | Tr (°C.) | Intermediate heating tW (sec) | Intermediate heating Surface temp. (°C.) | Tr-Ms | Value on right hand side of formula (1) | Second hot rolling Start temp. (°C.) | Second hot rolling End temp. (°C.) | DQ Start temp. (°C.) | DQ Average cooling rate (°C/s) | DQ End temp. (°C.) | Reheating heat treatment Q1 (°C.) | T1 (°C.) | Q2 (°C.) | T2 (°C.) | Remarks |
|---|---|---|---|---|---|---|---|---|---|---|---|---|---|---|---|---|---|---|---|---|---|---|---|---|
| A | A4 | 28 | 435 | 779 | 1250 | 1200 | 1131 | 1098 | 54 | 588 | 299 | 900 | 153 | 225 | 875 | 845 | 801 | 56 | 60 | 890 | 685 | — | — | CE |
| B | B4 | 16 | 427 | 774 | 1230 | 1160 | 1084 | 1037 | 56 | <u>583</u> | 261 | 920 | 156 | 173 | 880 | 827 | 793 | 56 | 54 | 880 | 700 | — | — | CE |
| C | C4 | 28 | 432 | 782 | 1265 | 1220 | 947 | 933 | 55 | <u>586</u> | 244 | 950 | 154 | 153 | 920 | 888 | 851 | 55 | 144 | 910 | 695 | — | — | CE |
| A | A5 | 28 | 435 | 779 | 1250 | 1200 | 1124 | 1093 | 56 | <u>459</u> | 41 | 900 | <u>24</u> | <u>14</u> | 880 | 851 | 808 | 54 | 62 | 890 | 685 | — | — | CE |
| B | B5 | 16 | 427 | 774 | 1250 | 1155 | 1075 | 1027 | 57 | 577 | 92 | 900 | <u>139</u> | <u>50</u> | 875 | 833 | 792 | 54 | 66 | 890 | 695 | — | — | CE |
| C | C5 | 28 | 432 | 782 | 1269 | 1225 | 941 | 922 | 55 | 517 | 156 | 950 | <u>85</u> | <u>68</u> | 925 | 896 | 844 | 56 | 141 | 910 | 695 | — | — | CE |
| A | A6 | 28 | 435 | 779 | 1310 | 1265 | 1172 | 1144 | 58 | 461 | 177 | 900 | <u>26</u> | <u>85</u> | 880 | 839 | 799 | 57 | 55 | 890 | 685 | — | — | CE |
| A | A7 | 28 | 435 | 779 | <u>1200</u> | 1000 | 791 | 704 | 56 | 471 | 181 | 900 | 36 | 89 | 880 | 844 | 805 | 55 | 53 | 890 | 685 | — | — | CE |
| A | A8 | 28 | 435 | 779 | 1200 | <u>1000</u> | <u>800</u> | <u>694</u> | 51 | 468 | 179 | 900 | 33 | 87 | 880 | 840 | 810 | 56 | 51 | 890 | 685 | — | — | CE |
| A | A9 | 28 | 435 | 779 | 1250 | 1200 | 1133 | <u>1100</u> | <u>31</u> | 499 | 187 | 900 | 64 | 94 | 880 | 838 | 798 | 54 | 52 | 890 | 685 | — | — | CE |
| A | A10 | 28 | 435 | 779 | 1250 | 1200 | 1131 | 1100 | <u>56</u> | 459 | 154 | <u>1056</u> | 24 | 67 | 1030 | 992 | 957 | 59 | 44 | 890 | 685 | — | — | CE |
| A | A11 | 28 | 435 | 779 | 1250 | 1200 | 1132 | 1099 | 55 | 464 | 171 | <u>798</u> | 29 | 80 | <u>795</u> | 792 | 789 | 51 | 59 | 890 | 685 | — | — | CE |
| A | A12 | 28 | 435 | 779 | 1250 | 1200 | 1130 | 1100 | 54 | 463 | 184 | <u>900</u> | 28 | 91 | 880 | <u>818</u> | 799 | 52 | 65 | 890 | 685 | — | — | CE |
| A | A13 | 28 | 435 | 779 | 1250 | 1200 | 1124 | 1091 | 56 | 459 | 166 | 900 | 24 | 76 | 880 | <u>830</u> | <u>761</u> | 49 | 72 | 890 | 685 | — | — | CE |
| A | A14 | 28 | 435 | 779 | 1250 | 1200 | 1131 | 1100 | 55 | 462 | 173 | 900 | 27 | 82 | 880 | 844 | <u>805</u> | <u>34</u> | 88 | 890 | 685 | — | — | CE |
| A | A15 | 28 | 435 | 779 | 1250 | 1200 | 1128 | 1094 | 56 | 466 | 177 | 900 | 31 | 85 | 880 | 851 | 809 | <u>56</u> | 330 | 890 | 685 | — | — | CE |
| A | A16 | 28 | 435 | 779 | 1250 | 1200 | 1134 | 1100 | 55 | 465 | 181 | 900 | 30 | 89 | 880 | 848 | 809 | 55 | <u>62</u> | 950 | 685 | — | — | CE |
| A | A17 | 28 | 435 | 779 | 1250 | 1200 | 1129 | 1094 | 53 | 472 | 166 | 900 | 37 | 76 | 880 | 850 | 810 | 54 | 57 | <u>839</u> | 685 | — | — | CE |
| A | A18 | 28 | 435 | 779 | 1250 | 1200 | 1132 | 1100 | 56 | 465 | 169 | 900 | 30 | 79 | 880 | 847 | 808 | 56 | 54 | 890 | 755 | — | — | CE |
| A | A19 | 28 | 435 | 779 | 1250 | 1200 | 1130 | 1100 | 58 | 470 | 179 | 900 | 35 | 87 | 880 | 848 | 806 | 53 | 63 | 890 | <u>600</u> | — | — | CE |

*1 Underline means outside of the range of the present invention
*2 Ms = 545 − 330 × (% C) − 7 × (% Si) − 23 × (% Mn) − 14 × (% Cr) − 5 × (% Mo) + 2 × (% Al) − 13 × (% Cu) − 4 × (% Nb) + 4 × (% V) + 3 × (% Ti)
*3 Ar3 = 910 − 273 × (% C) − 74 × (% Mn) − 56 × (% Ni) − 16 × (% Cr) − 9 × (% Mo) − 5 × (% Cu)
*4 (Tr − Ms) ≤ 10 + 0.0024 × (tW)$^2$ ... (1)
PE: Present Example,
CE: Comparative Example

TABLE 4-1

| Steel No. | Sample No. | ASTM prior austenite grain size number | YS (MPa) | $K_{ILIMIT}$ (MPa√m) | Remarks |
|---|---|---|---|---|---|
| A | A1 | 11.0 | 808 | 24.3 | Present Example |
| A | A2 | 10.5 | 774 | 24.6 | Present Example |
| A | A3 | 12.5 | 824 | 25.2 | Present Example |
| B | B1 | 11.0 | 819 | 24.1 | Present Example |
| B | B2 | 11.0 | 803 | 24.2 | Present Example |
| B | B3 | 13.0 | 808 | 25.5 | Present Example |
| C | C1 | 11.0 | 782 | 23.8 | Present Example |
| C | C2 | 10.5 | 771 | 23.3 | Present Example |
| C | C3 | 11.0 | 778 | 23.6 | Present Example |
| D | D1 | 10.5 | 833 | 23.5 | Present Example |
| D | D2 | 10.5 | 766 | 23.9 | Present Example |
| E | E1 | 10.5 | 859 | 23.0 | Present Example |
| E | E2 | 10.5 | 759 | 23.3 | Present Example |
| E | E3 | 10.5 | 762 | 23.4 | Present Example |
| E | E4 | 10.5 | 764 | 23.3 | Present Example |
| E | E5 | 10.5 | 772 | 23.2 | Present Example |
| F | F1 | 10.5 | 839 | 23.4 | Present Example |
| F | F2 | 10.5 | 763 | 23.8 | Present Example |
| G | G1 | 10.5 | <u>669</u> | 25.8 | Comparative Example |
| H | H1 | 10.5 | <u>744</u> | 24.2 | Comparative Example |
| I | I1 | 10.5 | <u>751</u> | 24.3 | Comparative Example |
| J | J1 | 10.5 | <u>725</u> | 24.9 | Comparative Example |
| K | K1 | 10.5 | <u>696</u> | 25.2 | Comparative Example |
| L | L1 | 11.0 | 822 | <u>22.1</u> | Comparative Example |

*1 Underline means outside of the range of the present invention

TABLE 4-2

| Steel No. | Sample No. | ASTM prior austenite grain size number | YS (MPa) | $K_{ILIMIT}$ (MPa√m) | Remarks |
|---|---|---|---|---|---|
| A | A4 | 9.5 | 799 | <u>21.5</u> | Comparative Example |
| B | B4 | 10.0 | 812 | <u>22.2</u> | Comparative Example |
| C | C4 | 10.0 | 766 | <u>22.0</u> | Comparative Example |
| A | A5 | 10.0 | 803 | <u>22.8</u> | Comparative Example |
| B | B5 | 10.0 | 809 | <u>21.8</u> | Comparative Example |
| C | C5 | 9.5 | 762 | <u>21.4</u> | Comparative Example |
| A | A6 | 10.0 | 803 | <u>22.7</u> | Comparative Example |
| A | A7 | 10.0 | 804 | <u>22.6</u> | Comparative Example |
| A | A8 | 10.0 | 805 | <u>22.5</u> | Comparative Example |
| A | A9 | 9.5 | 791 | <u>22.3</u> | Comparative Example |
| A | A10 | 9.5 | 794 | <u>22.4</u> | Comparative Example |
| A | A11 | 9.0 | 760 | <u>21.9</u> | Comparative Example |
| A | A12 | 10.0 | 804 | <u>22.8</u> | Comparative Example |
| A | A13 | 10.0 | 807 | <u>22.5</u> | Comparative Example |
| A | A14 | 9.5 | 795 | <u>22.2</u> | Comparative Example |
| A | A15 | 10.0 | 806 | <u>22.5</u> | Comparative Example |
| A | A16 | 9.0 | 759 | <u>21.4</u> | Comparative Example |
| A | A17 | 11.0 | 741 | 24.9 | Comparative Example |
| A | A18 | 11.0 | <u>728</u> | 25.3 | Comparative Example |
| A | A19 | 11.0 | 914 | <u>22.1</u> | Comparative Example |

*1 Underline means outside of the range of the present invention

As shown in Tables 3-1 and 3-2 and in Tables 4-1 and 4-2, the yield strength was satisfactory, and the $K_{ILIMIT}$ value was excellent in all of the present examples (sample Nos. A1 to A3, B1 to B3, C1 to C3, D1 to D2, E1 to E5, and F1 to F2) in which the steel compositions and manufacturing conditions satisfied the ranges according to aspects of the present invention, and the value of (Tr−Ms) was equal to or less than the value on the right-hand side of the formula (1) above, where Tr is the recuperation temperature, and Ms is the martensitic transformation start temperature of the steel.

In contrast, none of the sample Nos. G1, H1, I1, J1, and K1 of Comparative Examples satisfied the target yield strength.

In sample No. L1 of Comparative Example, large numbers of coarse oxide nonmetallic inclusions were observed, and the $K_{ILIMIT}$ value did not satisfy the target value.

In Comparative Examples (sample Nos. A4, B4, and C4) in which the steel compositions satisfied the preferred ranges but the recuperation temperature Tr after intermediate cooling exceeded (Ms+150° C.), bainite transformation did not occur after intermediate cooling and before start of intermediate heating. As a result, grain refinement was insufficient, and the $K_{ILIMIT}$ value did not satisfy the target value.

In Comparative Examples (sample Nos. A5, B5, C4, and C5) in which the value of (Tr−Ms) exceeded the value on the right-hand side of formula (1), bainite transformation started, but did not end before reheating started. As a result, grain refinement was insufficient, and the $K_{ILIMIT}$ value did not satisfy the target value.

Coarsening of austenite grains occurred, and the $K_{ILIMIT}$ value did not satisfy the target value in Comparative Example (sample No. A6) in which the heating temperature of the steel pipe material was above the upper limit of the present invention, and in Comparative Example (sample No. A10) in which the intermediate heating temperature was above the upper limit of the present invention.

In Comparative Examples (sample Nos. A7, A12) in which the end temperatures of the first and the second hot rolling were below the lower limit of the present invention, the low rolling temperatures had adverse effects on transformation in the subsequent cooling process, and the $K_{ILIMIT}$ value did not satisfy the target value.

In Comparative Example (sample No. A8) in which the intermediate cooling start temperature after the first hot rolling was below the lower limit of the present invention, and in Comparative Example (sample No. A13) in which the cooling start temperature of direct quenching was below the lower limit of the present invention, ferrite transformation occurred before intermediate cooling (sample No. A8) and before direct quenching (sample No. A13), and the transformed microstructure had grain mixing, with the result that the $K_{ILIMIT}$ value did not satisfy the target value.

In Comparative Example (sample No. A9) in which the average cooling rate of intermediate cooling was below the lower limit of the present invention, bainite transformation did not occur after intermediate cooling and subsequent recuperation and before the start of reheating. As a result, refinement of grains did not take place, and the $K_{ILIMIT}$ value did not satisfy the target value.

In Comparative Example (sample No. A11) in which the temperature of intermediate heating was below the lower limit of the present invention, reverse transformation did not end by the time of reheating, and refinement of grains did not take place, with the result that the $K_{ILIMIT}$ value did not satisfy the target value.

The effect of direct quenching was insufficient in Comparative Example (sample No. A14) in which the average cooling rate of direct quenching was below the lower limit of the present invention, and in Comparative Example (sample No. A15) in which the cooling stop temperature of direct quenching was above the upper limit of the present invention. As a result, refinement of grains did not take place, and the $K_{ILIMIT}$ value did not satisfy the target value.

In Comparative Example (sample No. A16) in which the heating temperature of reheating quenching in the reheating heat treatment was above the upper limit of the present invention, coarsening of austenite grains occurred, and the $K_{ILIMIT}$ value did not satisfy the target value.

Conversely, in Comparative Example (sample No. A17) in which the heating temperature of reheating quenching was below the lower limit of the present invention, some regions of steel was left untransformed after quenching, and the yield strength did not satisfy the target value.

In Comparative Example (sample No. A18) in which the tempering temperature after reheating quenching was above the upper limit of the present invention, reverse transformation occurred in parts of steel during tempering, and the yield strength did not satisfy the target value.

Conversely, in Comparative Example (sample No. A19) in which the tempering temperature was below the lower limit of the present invention, the strength excessively increased, and the $K_{ILIMIT}$ value did not satisfy the target value.

The invention claimed is:

1. A high-strength seamless steel pipe having a yield strength of 758 MPa or more, and a $K_{ILIMIT}$ value of 23.0 MPa√m or more as an evaluation index of sulfide stress corrosion cracking resistance, where $K_{ILIMIT}$ is a value determined from the intersection between (i) a linear regression line created by a stress intensity factor $K_{ISSC}$ obtained in a DCB (Double Cantilever Beam) test conducted multiple times under different test conditions, and an applied stress intensity factor $K_{Iapplied}$ at the tip of a notch in a test specimen before start of the DCB test, and (ii) a straight line on which $K_{ISSC}$ and $K_{Iapplied}$ are one-to-one.

2. The high-strength seamless steel pipe according to claim 1, which has a steel microstructure with a prior austenite grain size of 10.5 or more in terms of a grain size number in compliance with ASTM E112.

3. The high-strength seamless steel pipe according to claim 1, which has a composition that comprises, in mass %, C: 0.23 to 0.27%, Si: 0.35% or less, Mn: 0.45 to 0.70%, P: 0.010% or less, S: 0.0010% or less, Cr: 0.80 to 1.20%, Mo: 0.50 to 0.90%, Al: 0.080% or less, Cu: 0.09% or less, Nb: 0.050% or less, V: 0.050% or less, B: 0.0015 to 0.0030%, Ti: 0.005% or less, O: 0.0020% or less, and N: 0.0050% or less, and in which the balance is Fe and incidental impurities.

4. The high-strength seamless steel pipe according to claim 2, which has a composition that comprises, in mass %, C: 0.23 to 0.27%, Si: 0.35% or less, Mn: 0.45 to 0.70%, P: 0.010% or less, S: 0.0010% or less, Cr: 0.80 to 1.20%, Mo: 0.50 to 0.90%, Al: 0.080% or less, Cu: 0.09% or less, Nb: 0.050% or less, V: 0.050% or less, B: 0.0015 to 0.0030%, Ti: 0.005% or less, O: 0.0020% or less, and N: 0.0050% or less, and in which the balance is Fe and incidental impurities.

5. The high-strength seamless steel pipe according to claim 3, wherein the composition further comprises, in mass %, Ca: 0.0020% or less.

6. The high-strength seamless steel pipe according to claim 4, wherein the composition further comprises, in mass %, Ca: 0.0020% or less.

7. A method for manufacturing the high-strength seamless steel pipe of claim 1,
the method comprising:
a step of heating a steel pipe material to a heating temperature in a temperature region of 1,200 to 1,300° C.;
a first hot rolling step of hot rolling the heated steel pipe material by piercing and elongating the steel pipe material with a rolling end temperature of 800° C. or more;
an intermediate cooling step of cooling a raw steel pipe after the first hot rolling step, the raw steel pipe being cooled from a cooling start temperature of 700° C. or more under the conditions that the average cooling rate is 40° C./s or more, and the recuperation temperature Tr of the raw steel pipe at a pipe surface is (Ms+150° C.) or less, where Ms is a martensitic transformation start temperature;
an intermediate heating step of heating the raw steel pipe after the intermediate cooling step, the raw steel pipe being heated to a surface temperature of 800 to 1,000° C. after a lapse of a waiting time tW of 300 seconds or less by being charged into a reheating furnace;
a second hot rolling step of subjecting the raw steel pipe after the intermediate heating step to sizing hot rolling from a temperature equal to or greater than (Ar3+100° C.), where Ar3 is a ferrite transformation start temperature, and ending the hot rolling at a temperature of (Ar3+50° C.) or more;
a direct quenching step of directly quenching the raw steel pipe continuously from the second hot rolling step, the raw steel pipe being quenched from a temperature equal to or greater than (Ar3+10° C.) under the conditions that the average cooling rate is 40° C./s or more, and the cooling stop temperature is 200° C. or less; and
a heat treatment step of subjecting the raw steel pipe after the direct quenching step to at least one run of a heat treatment that quenches the raw steel pipe after reheating to a temperature of 850 to 930° C., and continuously tempering the raw steel pipe by heating to 650 to 730° C.,
the recuperation temperature Tr and the waiting time tW in the intermediate heating step satisfying the following formula (1):

$$(Tr-Ms) \leq 10+0.0024 \times (tW)^2 \qquad (1).$$

8. The method for manufacturing the high-strength seamless steel pipe according to claim 7, wherein the high-strength seamless steel pipe has a steel microstructure with a prior austenite grain size of 10.5 or more in terms of a grain size number in compliance with ASTM E112.

9. The method for manufacturing the high-strength seamless steel pipe according to claim 7, wherein the steel pipe material has a composition that comprises, in mass %, C: 0.23 to 0.27%, Si: 0.35% or less, Mn: 0.45 to 0.70%, P: 0.010% or less, S: 0.0010% or less, Cr: 0.80 to 1.20%, Mo: 0.50 to 0.90%, Al: 0.080% or less, Cu: 0.09% or less, Nb: 0.050% or less, V: 0.050% or less, B: 0.0015 to 0.0030%, Ti: 0.005% or less, O: 0.0020% or less, and N: 0.0050% or less, and in which the balance is Fe and incidental impurities.

10. The method for manufacturing the high-strength seamless steel pipe according to claim 8, wherein the steel pipe material has a composition that comprises, in mass %, C: 0.23 to 0.27%, Si: 0.35% or less, Mn: 0.45 to 0.70%, P: 0.010% or less, S: 0.0010% or less, Cr: 0.80 to 1.20%, Mo: 0.50 to 0.90%, Al: 0.080% or less, Cu: 0.09% or less, Nb: 0.050% or less, V: 0.050% or less, B: 0.0015 to 0.0030%, Ti: 0.005% or less, O: 0.0020% or less, and N: 0.0050% or less, and in which the balance is Fe and incidental impurities.

11. The method for manufacturing the high-strength seamless steel pipe according to claim 9, wherein the composition further comprises, in mass %, Ca: 0.0020% or less.

12. The method for manufacturing the high-strength seamless steel pipe according to claim 10, wherein the composition further comprises, in mass %, Ca: 0.0020% or less.

* * * * *